(12) United States Patent
Ihle et al.

(10) Patent No.: US 8,301,821 B2
(45) Date of Patent: Oct. 30, 2012

(54) COMMUNICATION MODULE FOR CONNECTING A SERIAL BUS TO A PLURALITY OF SYSTEM BUSES

(75) Inventors: Markus Ihle, Jettenburg (DE); Tobias Lorenz, Schwieberdingen (DE); Jan Taube, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 12/300,590

(22) PCT Filed: May 3, 2007

(86) PCT No.: PCT/EP2007/054310
§ 371 (c)(1),
(2), (4) Date: Mar. 17, 2009

(87) PCT Pub. No.: WO2007/134955
PCT Pub. Date: Nov. 29, 2007

(65) Prior Publication Data
US 2010/0064082 A1    Mar. 11, 2010

(30) Foreign Application Priority Data

May 24, 2006  (DE) .......................... 10 2006 024 889
Nov. 24, 2006 (DE) .......................... 10 2006 055 513

(51) Int. Cl.
*G06F 13/36* (2006.01)
*G06F 13/42* (2006.01)
(52) U.S. Cl. ............ 710/315; 710/20; 710/52; 710/106; 710/107; 710/306; 710/309; 710/310
(58) Field of Classification Search ............... 710/20, 710/52, 306, 309, 310, 315
See application file for complete search history.

(56) References Cited

U.S. PATENT DOCUMENTS

| | | | | |
|---|---|---|---|---|
| 5,859,988 A * | 1/1999 | Ajanovic et al. | .............. | 710/306 |
| 6,430,639 B1 * | 8/2002 | Meyer et al. | ................... | 710/200 |
| 7,225,055 B2 * | 5/2007 | Graff et al. | .................... | 700/282 |
| 7,266,450 B2 * | 9/2007 | Glaza | ............................ | 701/210 |
| 7,328,300 B2 * | 2/2008 | Bennett | ......................... | 710/312 |
| 7,340,551 B2 * | 3/2008 | Elliott et al. | .................. | 710/309 |

(Continued)

FOREIGN PATENT DOCUMENTS

EP      1 251 432      10/2002

(Continued)

OTHER PUBLICATIONS

International Search Report of Application No. PCT/EP2007/054310, dated Aug. 23, 2007.

*Primary Examiner* — Brian Misiura
(74) *Attorney, Agent, or Firm* — Kenyon & Kenyon LLP

(57) ABSTRACT

A communication module for connecting a serial bus, which transmits data in packets, to a plurality of system buses of a gateway, which transmit data word by word, the communication module having a communication protocol unit, which is connected to the serial bus, for converting between data packages and messages, which are respectively made up of a plurality of data words, a message relaying unit for relaying messages between at least one message memory and the communication protocol unit, as well as buffer memories, a plurality of interface units, which are respectively connected to an associated system bus of the gateway, each interface unit being connected to at least one associated buffer memory, which stores a message temporarily, a transmission of data words via a plurality of system buses and their associated interface units from and to the buffer memories of the interface units taking place simultaneously, without delay.

18 Claims, 3 Drawing Sheets

U.S. PATENT DOCUMENTS

| | | | |
|---|---|---|---|
| 7,350,015 B2 * | 3/2008 | Barrenscheen et al. | 710/311 |
| 7,590,764 B2 * | 9/2009 | Rooney | 710/5 |
| 7,907,623 B2 * | 3/2011 | Ihle et al. | 370/402 |
| 8,171,199 B2 * | 5/2012 | Ihle et al. | 710/316 |
| 2002/0161960 A1 | 10/2002 | Bahren | |
| 2005/0138246 A1 | 6/2005 | Chen et al. | |
| 2006/0041705 A1 | 2/2006 | Bueti et al. | |

FOREIGN PATENT DOCUMENTS

| | | |
|---|---|---|
| JP | 4-241039 | 8/1992 |
| JP | 5-289896 | 11/1993 |
| JP | 6-178365 | 6/1994 |
| JP | 7-46665 | 2/1995 |
| WO | 2004/047385 | 6/2004 |

* cited by examiner

COMMUNICATION MODULE FOR CONNECTING A SERIAL BUS TO A PLURALITY OF SYSTEM BUSES

FIELD OF THE INVENTION

The present invention relates to a communication module for connecting a serial bus, in particular a communication module for a gateway to which multiple serial field buses are connected.

BACKGROUND INFORMATION

In recent years, in the manufacturing of modern motor vehicles and machine construction, in particular in both the machine tool sector and automation, there has been a drastic increase in the networking of control units, sensors, and actuators with the aid of a network or a communication system made up of a communication connection, in particular a bus, and corresponding communication modules. In this context, synergistic effects may be achieved by distributing functions to a plurality of users, in particular control devices. These are known as distributed systems. Such distributed systems or networks are thus made up of the users and the bus system connecting these users, or multiple connecting bus systems. Communication between different stations and users thus takes place more and more via such a communication system, bus system, or network, via which the data to be transmitted are transmitted in messages. This communication traffic on the bus system, access and receiving mechanisms, and error handling are regulated via a corresponding protocol, the name of the respective protocol frequently being used as a synonym for the network or bus system itself, as done here.

The CAN interface (Controller Area Network) is established as a protocol in the automotive sector, for example. This is an event-driven protocol, i.e., protocol activities such as sending a message are initiated by events that have their origin outside of the communications system. Unique access to the communication system or bus system is triggered via priority-based bit arbitration. A prerequisite for this is that a priority is assigned to the data to be transmitted and thus to every message. The CAN protocol is very flexible. It is thus readily possible to add additional users and messages as long as there are still free priorities (message identifiers). The compilation of all messages that are to be sent in the network together with priorities and their transmitting and receiving users or the corresponding communication modules are stored in a list known as the communication matrix.

An alternative approach to event-triggered, spontaneous communication is the purely time-triggered approach. All communication activities on the bus are strictly periodic. Protocol activities such as the transmission of a message are triggered only by the passage of a time applicable to the entire bus system. Access to this medium is based on the allocation of time ranges in which a transmitter has an exclusive transmission right. As a rule, the sequence of messages is to be set already before start-up in this instance. Thus, a schedule is drawn up which meets the requirements of the messages with regard to repetition rate, redundancy, deadlines, etc. This is known as a bus schedule. TTP/C is such a bus system, for example.

A combination of the advantages of both known bus types occurs in the design approach of the so-called TTCAN (Time-Triggered Controller Area Network). This meets the requirements outlined above for time-triggered communication as well as the requirements for a certain degree of flexibility. TTCAN meets these requirements by structuring the communication cycle in so-called exclusive time windows for periodic messages of certain communication users, and in so-called arbitrating time windows for spontaneous messages of a plurality of communication users. TTCAN is essentially based on a time-triggered, periodic communication, which is clocked by a user or communication module, which provides the operating time and is known as the time master, with the help of a time reference message.

Another possibility for connecting different transmission types is the FlexRay protocol, which describes a fast, deterministic and fault-tolerant bus system in particular for use in a motor vehicle. The FlexRay protocol operates according to the method of Time Division Multiple Access (TDMA), in which the users and the messages to be transmitted are respectively assigned fixed time slots in which they have exclusive access to the communication connection, the bus. In this context, the time slots repeat in a fixed cycle, so that the instant at which a message is transmitted via the bus can be predicted exactly, and the bus access takes place deterministically. To optimally utilize the bandwidth for the message transmission on the bus system, the cycle is subdivided into a static and a dynamic portion. The fixed time slots are in the static portion at the beginning of a bus cycle.

In the dynamic part, the time slots are assigned dynamically. Therein, the exclusive bus access is then permitted for only a brief time in each instance. If no access occurs, access is enabled for the next user. This time span in which the system waits for access by the first user is called a minislot.

As was just illustrated, there is a multitude of different transmission technologies and thus types of bus systems or networks. Frequently, a plurality of bus systems of the same kind or of different kinds have to be connected to one another. A bus interface unit, a so-called gateway, is used for this purpose. A gateway is thus an interface between different buses, which may be of the same or different types, the gateway relaying messages from one bus to one or more other buses. Known gateways are made up of a plurality of independent communication modules, messages being exchanged in this context respectively via the processor interface (CPU interface) of the respective user, and the corresponding interface module of the respective communication module. In the process, this CPU interface is highly loaded by this exchange of data in addition to the messages to be transmitted to the user itself which means that, together with the transmission structure resulting from this, a relatively low data transmission speed results.

Further, there are integrated communication controllers or communication modules that share one joint message memory, the so-called message memory or message RAM, in order to thus compensate the structural disadvantages. However, because of this, such integrated communication modules are very inflexible with regard to data transmission and in particular are fixed to a specific number of bus connections and most of the time also to the same bus system.

FIG. 1 shows a conventional communication module or communication controller CC for a conventional gateway, as shown in FIG. 2. Communication module CC has an interface for an internal peripheral bus or system bus of the gateway, and an additional interface for an external serial bus. The system bus includes an address bus, a data bus, and a control bus and is used for the internal transmission of data within the gateway. A host CPU having a data memory RAM, and a gateway unit are connected to the system bus in addition to the communication module. The host CPU is used for internal data processing and the gateway unit controls the internal transfer of data from one communication module CC to another communication module CC. Communication modules CC communicate with the host CPU and the gateway unit in accordance with the master/slave principle, communication modules constituting slave units and the host CPU and the gateway unit respectively forming master units.

As can be seen from FIG. 1, the internal interface of communication module CC to the system bus is formed by a two-layer interface, to with by a customer interface and a generic interface. The customer interface connects the system bus to the generic interface, the customer interface being manufacturer-specific and easily exchangeable. The generic interface is able to be connected to a large number of customer-specific system buses via the customer interface. Communication module CC according to the related art and as shown in FIG. 1 also contains buffer memories for temporarily storing data to be transferred. The buffer memories are formed by RAM or data registers, for example. Communication module CC additionally contains a message relaying unit or message handler for relaying between messages from at least one message memory and one communication protocol unit.

The message memory or the message RAM acts as a message memory and temporarily stores the message objects to be transferred as well as configuration and status information data. The message relaying unit takes over the control of the data flow between all buffer memories, the communication protocol unit, and the message buffer. The communication protocol unit (PRT) of conventional communication module CC shown in FIG. 1 implements the communication according to the data transmission protocol used. In this context, communication protocol unit PRT takes over the transformation or conversion between the data format of data packages DP transmitted via the external serial bus and messages MSG used inside the communication module. Messages MSG relayed by the message relaying unit or the message handler are made up of at least one data word DW, the word length or the bit number of data word DW corresponding to the bus width of the gateway data bus provided internally. If the system bus has a 32-bit-wide internal data bus, for example, then data word DW likewise includes 32 bits. A message MSG is able to be made up of a predefined number of data words DW. The memory capacity of a buffer memory corresponds to the data volume of a message that includes a predefined number of data words DW, for example. The arbitration of the data flow is performed by the message relaying unit or the message handler.

The conventional gateway, as shown in FIG. 2, contains a plurality of master units, to with the host CPU and the gateway unit. Since both master units access the data within a communication module CC via the same system bus or periphery bus and via a joint interface, an access conflict may occur. For example, it is possible for different master units to simultaneously want to access the data of one communication module CC via its system bus interface. In this case, one of the master units must wait to access data until the other master unit has completed its data access. This data access may be the writing, but also the reading of data from the buffer memory of communication module CC.

SUMMARY OF THE INVENTION

It is thus an objective of the exemplary embodiments and/or exemplary methods of the present invention to create a communication module for a gateway, which communication module minimizes the latency time when data is accessed simultaneously by different master units.

According to the exemplary embodiments and/or exemplary methods of the present invention, this objective is attained by a communication module having the features described herein.

The exemplary embodiments and/or exemplary methods of the present invention creates a communication module for connecting a serial bus that transmits data in packets to a plurality of other communication modules and word by word to a plurality of system buses of a gateway, the communication module having:
  one communication protocol unit connected to the serial bus for conversion between data packets and messages, which are respectively made up of a plurality of data words,
  a message relaying unit for relaying messages between at least one message memory and the communication protocol unit as well as buffer memories,
  a plurality of interface units, each of which are connected to an associated system bus of the gateway, each interface unit being connected to at least one associated buffer memory that temporarily stores a message,
  a transmission of data words from and to the buffer memories of the interface units taking place simultaneously, without delay, via multiple system buses and their associated interface units.

In one specific embodiment of the communication module according to the present invention, the serial bus is a field bus.

In one specific embodiment of the communication module according to the present invention, the field bus is constituted by a CAN (Controller Area Network) bus.

In one alternative specific embodiment of the communication module according to the present invention, the field bus is a FlexRay bus.

In one additional specific embodiment of the communication module according to the present invention, the field bus is a MOST bus.

In one additional alternative specific embodiment of the communication module according to the present invention, the serial bus is constituted by an ethernet bus.

In one specific embodiment of the communication module according to the present invention, each system bus which may have an associated system bus master.

In one specific embodiment of the communication module according to the present invention, the message relaying unit signals to the system bus master of the system bus the reception of a message to be transmitted word by word via a system bus.

In one alternative specific embodiment of the communication module according to the present invention, the message relaying unit confirms via signals to the system master the reception of a message to be transmitted, after it has requested the information.

In one additional specific embodiment of the communication module according to the present invention, a message that is received by the system bus, temporarily stored in a buffer memory, and relayed by the message relaying unit to the message memory has at least one flag bit for signaling via the serial bus that it is clear to send.

The exemplary embodiments and/or exemplary methods of the present invention additionally creates a method for the bidirectional transmission of data between a serial bus, which transmits data in packets, and system buss, which transmit data word by word, having the following steps:
  conversion of data packets, which are transmitted via the serial bus, into messages having multiple data words,
  temporary storage of messages in buffer memories, and transmission of data words from and to buffer memories simultaneously via multiple system buses without delay.

In the following, exemplary embodiments of the communication module according to the present invention and of the method according to the present invention for the bidirectional transmission of data are described in more detail with reference to the attached figures to explain features that are essential to the invention.

DETAILED DESCRIPTION

Figure 3:
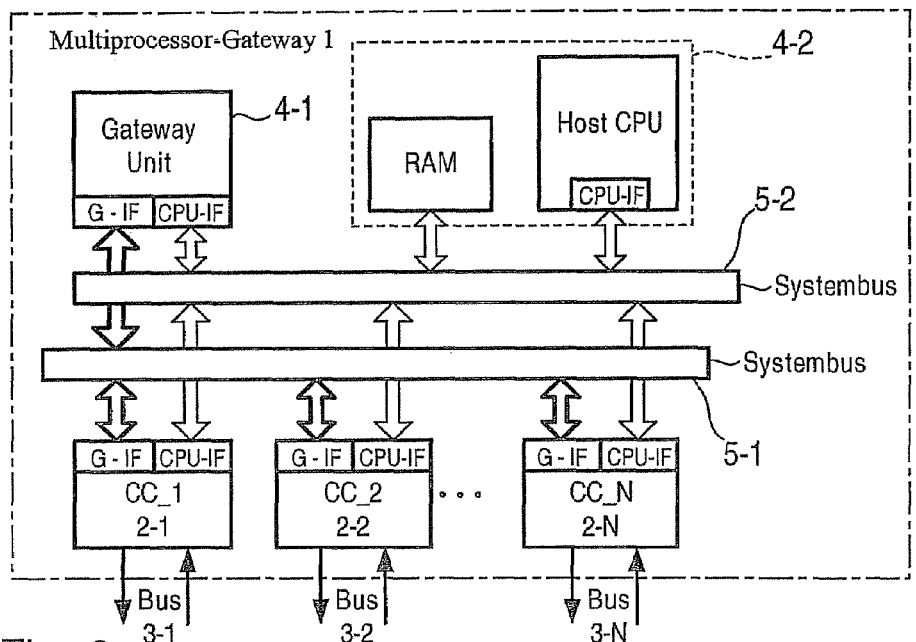
FIG. 3 shows a multiprocessor gateway containing communication modules according to the present invention.

As can be seen from FIG. 3, according to the present invention a multiprocessor gateway 1 has a plurality of communication modules 2-$i$, each of which are able to be connected to a serial bus 3-$i$. For example, the serial bus 3-$i$ is a field bus, or an ethernet bus. Data are transmitted in packets via the serial buses 3-$i$. Transmitted data packets DP include administrative or header data, and useful data or payload data. Multiprocessor gateway 1 has multiple master units or processors 4-1, 4-2. These master units are able to take over different functions.

In the example shown in FIG. 3, a first master unit is made up of a gateway unit 4-1 that controls the transfer of data between different communication modules 2-$i$ according to the present invention. A further processor 4-2 is a host CPU for the data processing of the internally transmitted data words DW. Additionally, multiprocessor gateway 1 has a plurality of system buses 5-1, 5-2. Each master unit 4-1, 4-2 may have an independent system bus. Each system bus has an independent data, address, and control bus. Within multiprocessor gateway 1, data is transmitted word by word, the length of the data word corresponding to the bus width of the respective data bus. In an exemplary embodiment, communication modules 2-$i$ according to the present invention have an associated interface for each system bus 5-$i$.

Figure 4:
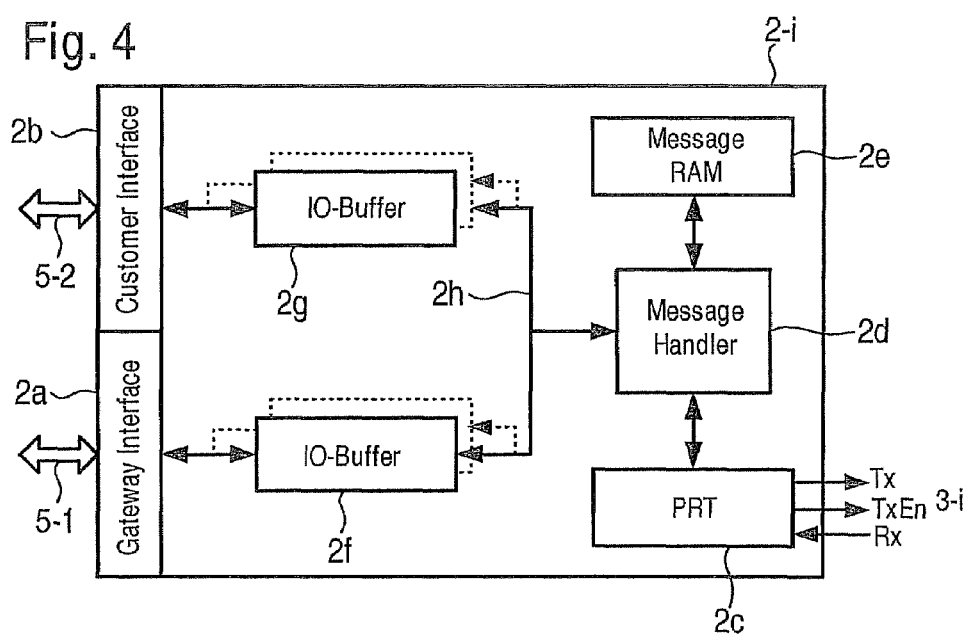
FIG. 4 shows a block diagram of one possible specific embodiment of the communication module according to the present invention.

FIG. 4 shows one possible specific embodiment of communication module 2-$i$ according to the present invention. Communication module 2 is used to connect a serial bus 3 via an interface, communication module 2-$i$ having for each internal system bus 5-$i$ of multiprocessor gateway 1 an additional separate interface 2a, 2b. In the specific embodiment shown in FIG. 4, communication module 2-$i$ has a first interface 2a for connecting to system bus 5-1, whose master unit is constituted by gateway unit 4-1. In addition, communication module 2-$i$ has an additional interface 2b for connecting to system bus 5-2 of multiprocessor gateway 1, whose bus master is constituted by the host CPU of processor 4-2. A communication protocol unit 2c of the communication module is connected to external serial data bus 3-$i$. Communication protocol unit 2c carries out a conversion between data packets DP, which are transmitted externally via serial data bus 3-$i$, and internal messages MSG, which are respectively made up of one or more data words DW.

Communication module 2 additionally contains a message relaying unit or a message handler 2d for relaying via internal data lines 2a messages between at least one internal message memory or message RAM 2e and communication protocol unit 2c, as well as different buffer memories 2f, 2g. The memory capacity of a buffer memory 2f, 2g corresponds to the data volume of a message to be transmitted, for example, that is, a predefined number of data words DW.

Communication module 2-$i$ has a plurality of interface units 2a, 2b, which are respectively connected to an associated system bus 5-$i$ of gateway 1. In this context, each interface unit 2a, 2b is connected to at least one associated buffer memory 2f, 2g, in which at least one message is able to be stored temporarily.

In a communication unit 2-$i$, data words DW are transmitted simultaneously, without delay, from and to buffer memories 2f, 2g of the interface units via different system buses 5-1, 5-2 and their associated interface units 2a, 2b.

The arbitration of the data transfer, that is, the arbitration of the transfer of data to buffer memories 2f, 2g and message buffer 2e or message RAM is performed by message relaying unit 2d. For example, 128 messages MSG are able to be stored in message RAM 2e. In one specific embodiment of communication module 2, message forwarding unit 2d signals to system bus master 4-$i$ of the system bus that a message MSG transmitted word by word via a system bus 5-$i$ has been received. In an alternative specific embodiment, message relaying unit 2d confirms via signals to system master 4-$i$ the reception of a message to be transmitted, after it has requested the information. The writing of data by a bus master 4-$i$ via the data bus of a system bus 5-$i$ and via the associated interface to a buffer memory of communication module 2 occurs relatively quickly, that is, bus master 4-$i$ does not have to wait for data access.

As can be seen from FIG. 4, the arbitration of communication module 2-$i$ according to the present invention is carried out by message relaying unit 2d not on the time-critical system side, that is, on the side of system buses 5, but rather on the less time-critical peripheral side, that is, on the side of external serial data buses 3. Thus, in comparison to traditional communication modules, in communication module 2 according to the present invention, the waiting time is thus shifted, to a certain extent, from the system side to the peripheral side. In the specific embodiment shown in FIG. 4, a gateway interface 2a is implemented in addition to manufacturer and application specific interface 2b. This interface 2a provides a possibility to access a message object for a gateway unit 4-1 that operates concurrently with the host CPU of processor 4-2. Gateway unit 4-1 is constituted by a coprocessor, for example. Gateway unit 4-1 has access to all functions/registers and message objects that are necessary for the gateway function or the data transfer between communication modules. The arbitration of data traffic between the CPU and gateway unit 4-1 is performed by the message handler or message relaying unit 2d of communication module 2.

In one specific embodiment of the communication module according to the present invention, a message which is received by system bus 5, temporarily stored in a buffer memory, and relayed by message relaying unit 2d to message memory 2e, has at least one flag bit for signaling via serial bus 3 that it is clear to send.

When a message data packet DP is received by serial field bus 3 via multiprocessor gateway 1, the following steps are carried out.

First, data packet DP is received by communication protocol unit 2c and redundant data used for transmission security are removed by communication protocol unit 2c. Remaining data form a message MSG. Communication protocol unit 2c signals to message relaying unit 2d that a message has been received. Message relaying unit 2d or message handler 2d arbitrates the desired data transfer wish. To this end, further requests for additional data transfers on the part of message handler 2d are also queried. In one possible specific embodiment, message handler 2d makes a decision in accordance with a predefined prioritization regarding which data transfer is to be performed next. Afterwards, entire message MSG is transferred completely or data word by data word from communication protocol unit 2c to message RAM 2e.

Furthermore, message handler or message relaying unit 2d signals to the master unit or the CPU via an internal interrupt signal, for example, that a message has been received. In an additional step, the master unit or the CPU requests the received message using a request. Message handler 2d verifies the CPU's request and arbitrates the data transfer. Afterwards, the message is transferred completely, data word by data word, from message RAM 2e to interface register or buffer memory 2f, 2g of master unit 4, which is making the request. If, for example, the message is requested by gateway unit 4-1 as the master unit of system bus 5-1, data is transferred from message RAM 2e to buffer memory 2f of gateway interface 2a. If the request message comes from the host CPU of processor 4-2 as a master unit of system bus 5-2, the message is transferred by message relayer 2d from message RAM 2e to buffer memory 2g of customer interface 2b. Once the internal transfer of data to the buffer memory is completed, master unit 4 of system bus 5 connected to it subsequently reads out the message word by word via the data bus of the respective system bus 5.

In the following, the sending of a message MSG, which is made up of a plurality of data words DW, from a master unit 4 to a serial bus 3-i is described.

Master unit 4, for example, the host CPU of processor 4-2, writes the data word by word into the buffer memory of communication module 2 via the data bus of the respective system bus 5-i and the corresponding interface. Furthermore, message relaying unit 3d is notified that a request for writing a message to message RAM 2e exists. This signaling may take place through the setting of flags, for example. Afterwards, message handler 2d arbitrates the internal data transfer, a check being carried out to determine whether further requests for an additional transfer of data at the same time exist. As soon as the data transfer is able to take place, the message temporarily stored in the buffer memory is transferred word by word or completely from the internal interface register or buffer memory to the message memory or the message RAM. A message stored in message RAM 2e is accordingly identified for message handler 2d by setting a corresponding display flag, for example. In a further step, the message to message handler 2d that is to be transmitted to the external serial bus is transferred word by word or all at once to communication protocol unit 2c.

Communication protocol unit 2c implements a conversion into the data format of the externally used data transmission protocol. The data are packaged into data packets DP, which on the one hand contain header or administrative data and on the other hand contain useful or payload data. Furthermore, communication protocol unit 2c adds redundant data as transmission protection. In a further step, data packets DP formed in this way are sent by communication protocol unit 2c via serial external data bus 3. For example, actuators or sensors are connected to external serial data bus 3. External serial data bus 3 may be a CAN (Controller Area Network) bus, a FlexRay bus, a MOST bus, or a LIN bus, for example. In an alternative specific embodiment, serial bus 3 is constituted by an ethernet bus.

Figure 1:
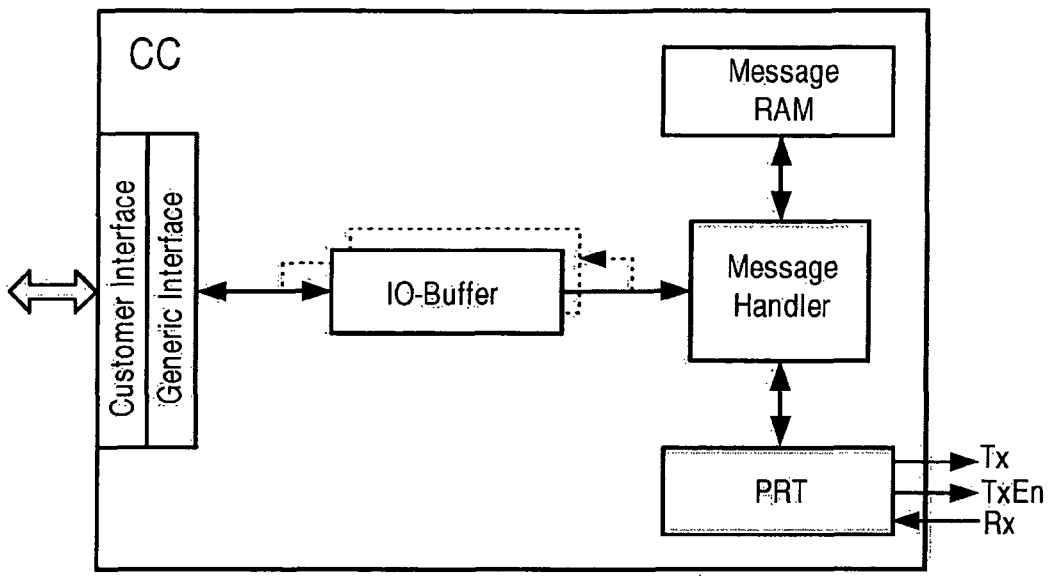
FIG. 1 shows a communication module according to the related art.
Figure 2:
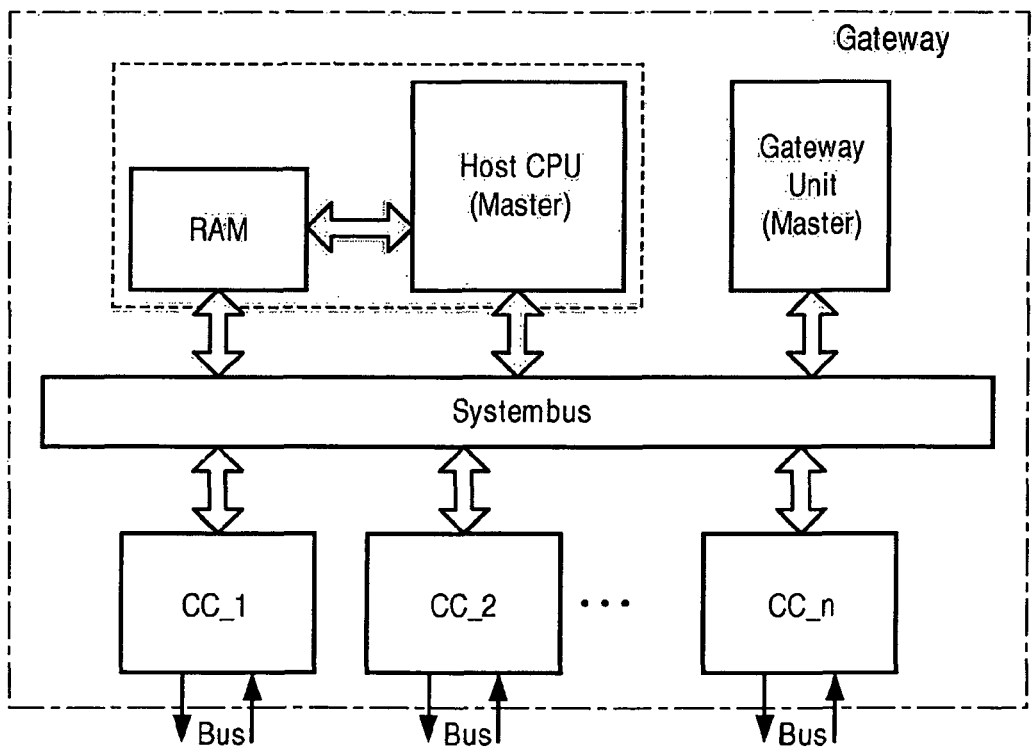
FIG. 2 shows a gateway according to the related art.
Figure 5:
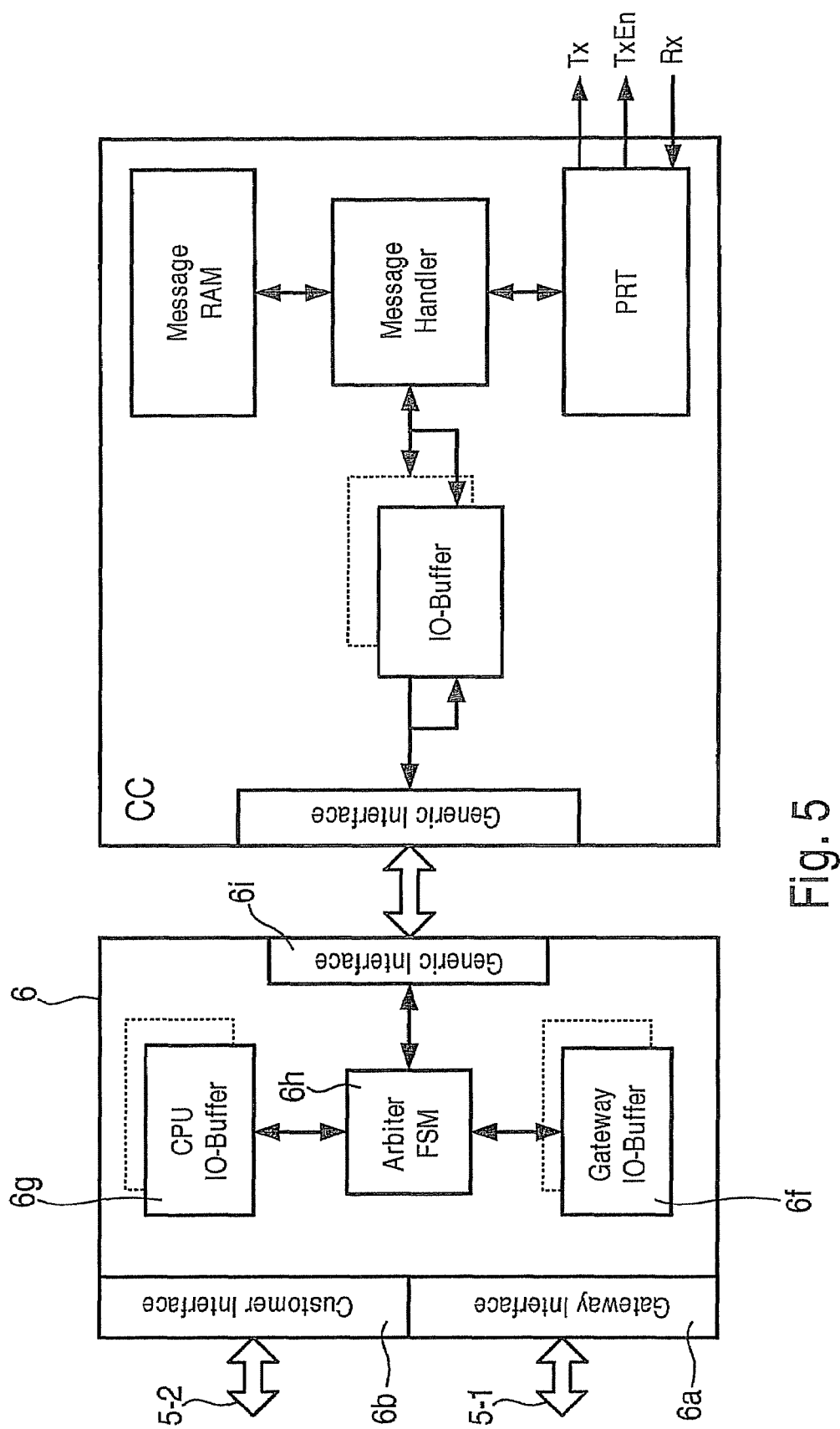
FIG. 5 shows an extension, in terms of circuit engineering, of a conventional communication module to establish a compatibility with the communication module according to the present invention.

FIG. 5 illustrates a relaying circuit or adapter circuit 6 that makes it possible to connect a traditional communication module CC according to FIG. 1 to a multiprocessor gateway 1 according to the present invention, as shown in FIG. 3. The adapter circuit contains a gateway interface 6a and a customer interface 6b. Both interfaces 6a, 6b respectively have an associated buffer memory 6f, 6g. An arbiter FSM (Finite State Machine) 6h, which performs the corresponding prioritization of the data transmission, arbitrates the data transfer. Adapter circuit 6 additionally contains a generic interface 6i corresponding to the generic interface of the traditional communication module CC according to the related art, as shown in FIG. 1.

Adapter circuit 6 enables the compatible use of communication modules 2 according to the present invention, as shown in FIG. 4, with conventional communication modules CC according to the related art, as shown in FIG. 1.

Communication module 2 according to the present invention permits two controlling modules or master units 4 to simultaneously access data that are stored or temporarily stored in a separate buffer memory of communication module 2. When data is accessed simultaneously, the bandwidth of the data transmission of communication module 2 according to the present invention is therefore increased. No wait cycles arise during data accesses due to the data arbitration carried out by message relaying unit 2d.

What is claimed is:

1. A system, comprising:
an adapter circuit including a customer interface having a first buffer memory, a gateway interface having a second buffer memory, a first generic interface, and an arbiter finite state machine prioritizing and arbitrating data transmission over the customer and gateway interfaces; and
a communication module for connecting a serial bus, which transmits data in packets, to a plurality of system buses of a gateway, which transmit data word by word, the communication module, including:
a second generic interface coupled to the first generic interface of the adapter circuit;
a communication protocol unit connected to the serial bus for converting between data packets and messages, which are respectively made up of a plurality of data words; and
a message relaying unit coupled to the second generic interface for signaling a master unit of at least one system bus through the second generic interface and the adapter circuit that a message has been received at the communication protocol unit and routing the received message to the second generic interface and the adapter circuit connected to a system bus transmitting a request for the received message;
wherein data words are transmitted simultaneously from and to the buffer memories of the customer and gateway interfaces and each interface includes an associated device-independent system bus master.

2. The communication module of claim 1, wherein the serial bus is a field bus.

3. The communication module of claim 2, wherein the field bus is a Controller Area Network (CAN) bus.

4. The communication module of claim 2, wherein the field bus is a FlexRay bus.

5. The communication module of claim 2, wherein the field bus is a MOST bus.

6. The communication module of claim 2, wherein the field bus is a LIN bus.

7. The communication module of claim 1, wherein the serial bus is an ethernet bus.

8. The communication module of claim 1, wherein the message relaying unit signals to the system bus master of the system bus that a message transmitted word by word via a system bus has been received.

9. The communication module of claim 1, wherein the message relaying unit confirms via signals to the system bus master that a message to be transmitted has been received, after the system bus master has requested this information.

10. The communication module of claim 1, wherein a message received by the system bus, which message is temporarily stored in a buffer memory and relayed by the message relaying unit to the message memory, has at least one flag bit for signaling via the serial bus that the message is clear to send.

11. A method for the bidirectional transmission of data between a serial bus, which transmits data in packets, and system buses, which transmit data word by word, the method comprising:
    converting data packets, which are transmitted via the serial bus, into messages having multiple data words;
    temporarily storing messages in buffer memories;
    responsive to receiving a converted message via data packets from the serial bus, signaling a master unit of at least one of the communicatively coupled system buses from a message relaying unit in a communications module coupled to a first generic interface in the communications module coupled to a second generic interface of an adapter circuit including a customer interface having a first buffer memory, a gateway interface having a second buffer memory, and an arbiter finite state machine prioritizing and arbitrating data transmission over the customer and gateway interfaces that the message has been received; and
    responsive to receiving a request for the received message from a master unit over a communicatively coupled system bus, routing the converted message having multiple data words over the communicatively coupled system bus transmitting the request via the arbiter finite state machine in the adapter circuit, wherein each of the communicatively coupled system buses includes an associated device-independent system bus master.

12. The method of claim 11, wherein the message relaying unit signals to the system bus master of the system bus that a message transmitted word by word via a system bus has been received.

13. The method of claim 11, wherein the message relaying unit confirms via signals to the system bus master that a message to be transmitted has been received, after the system bus master has requested this information.

14. The method of claim 11, wherein a message received by the system bus, which message is temporarily stored in a buffer memory and relayed by the message relaying unit to the message memory, has at least one flag bit for signaling via the serial bus that the message is clear to send.

15. The method of claim 11, wherein the serial bus is a field bus, wherein the message relaying unit signals to the system bus master of the system bus that a message transmitted word by word via a system bus has been received, and wherein a message received by the system bus, which message is temporarily stored in a buffer memory and relayed by the message relaying unit to the message memory, has at least one flag bit for signaling via the serial bus that the message is clear to send.

16. The method of claim 11, wherein the serial bus is a field bus, wherein the message relaying unit confirms via signals to the system bus master that a message to be transmitted has been received, after the system bus master has requested this information, and wherein a message received by the system bus, which message is temporarily stored in a buffer memory and relayed by the message relaying unit to the message memory, has at least one flag bit for signaling via the serial bus that the message is clear to send.

17. The communication module of claim 1, wherein the serial bus is a field bus, wherein the message relaying unit signals to the system bus master of the system bus that a message transmitted word by word via a system bus has been received, and wherein a message received by the system bus, which message is temporarily stored in a buffer memory and relayed by the message relaying unit to the message memory, has at least one flag bit for signaling via the serial bus that the message is clear to send.

18. The communication module of claim 1, wherein the serial bus is a field bus, wherein the message relaying unit confirms via signals to the system bus master that a message to be transmitted has been received, after the system bus master has requested this information, and wherein a message received by the system bus, which message is temporarily stored in a buffer memory and relayed by the message relaying unit to the message memory, has at least one flag bit for signaling via the serial bus that the message is clear to send.

* * * * *